Dec. 1, 1964

A. GUDMUNDSEN 3,158,956

TREE GIRDLER

Filed Feb. 20, 1961

Austin Gudmundsen,
INVENTOR.

WHANN & McMANIGAL
Attorneys for Applicant

United States Patent Office 3,158,956
Patented Dec. 1, 1964

3,158,956
TREE GIRDLER
Austin Gudmundsen, Inglewood, Calif., assignor to McCulloch Corporation, Los Angeles, Calif., a corporation of Wisconsin
Filed Feb. 20, 1961, Ser. No. 90,251
13 Claims. (Cl. 47—1)

The present invention relates to a tree girdler and, more particularly, to one in which the cutting means is a small saw chain.

In the growing of trees, especially where trees are grown as a crop, there are always a number of trees which should be killed in place instead of being cut down. These trees are generally referred to as weed trees and they are undesirable because they consume the nitrogen and other elements in the soil and also tend to shade the smaller trees so as to stunt the latter's growth.

Because the felling of the weed trees would result in damage to the desirable trees, the former are usually killed by girdling. This involves the cutting of a circumferential groove around the tree deeper than the cambium layer of growth. In the prior art, this has been done by walking around the tree and cutting the groove with hand or power driven tools. Either way is tedious, time consuming, and expensive.

According to the present invention, the operator can girdle a tree by remaining on one side of it and taking one or two short steps to complete the operation.

It is an object of the present invention to provide an improved tree girdler.

It is another object of the present invention to provide a tree girdler that will permit the operator to girdle the tree without walking around it.

It is still another object of the invention to provide a device to greatly simplify and shorten the time for cutting a girdle in a tree.

It is a further object of the present invention to provide a device which greatly reduces the effort required of the operator of the girdling device. This makes it possible for a man to girdle many more trees per day, not only because he can do each tree faster, but because the effort required for each tree is less.

It is a still further object of the present invention to provide a power driven tree girdler that is of light weight and is easy to manipulate and carry.

It is a still further object of the present invention to provide a tree girdler which can be adjusted to cut the proper depth girdle for various types of trees.

It is another object of the invention to provide a tree girdler having a depth gauge which prevents the cutting down of small trees during the girdling process. Since it is not generally desired to cut down trees to be killed by girdling because of the damage their falling does to other trees, it is of considerable advantage to have a means in the girdling device to automatically limit the depth of the girdle cut.

Further objects and advantages of the invention may be brought out in the following part of the specification wherein small details have been described for the competence of disclosure, without intending to limit the scope of the invention which is set forth in the appended claims.

Referring to the accompanying drawing, which is for illustrative purposes only:

FIG. 1 is an elevational view of an operator using the present invention to cut a girdle in a tree;

FIG. 2 is a fragmentary plan view of a tree girdler, according to the present invention;

FIG. 3 is a fragmentary partial sectional view in elevation, taken as indicated by the line 3—3 in FIG. 2; and FIG. 4 is a plan view illustrating the girdling operation according to the present invention.

Referring again to the drawing, in FIG. 1 a tree girdler, generally designated as 10, is shown as it is carried and used by an operator. The power supply means 11 is shown in the form of a gasoline engine and the power is transmitted through a shank or handle 12 to which is connected at its outer end a transmission housing 13. Rotatably mounted above the housing 13 is the cutting means or chain saw, generally designated as 14.

For ease of handling, the tree girdler 10 is supported in part by the harness 18 over the operator's shoulders, and is additionally guided and supported by the operator with his one hand on gripping means 19 on the engine and with his other hand supporting the handle 12.

As may be seen in FIGS. 2 and 3, the power from the engine 11 is transmitted to the transmission housing 13 by means of a shaft 20 connected to the engine. The shaft 20 has on its outer end a beveled gear 21 which is meshed with a second beveled gear 25. Gear 25 is fixedly secured to a small diameter portion 26 of the chain saw driving shaft, generally designated as 27. The lower end 28 of shaft 27 is bearing mounted for rotation in lug 32 within the housing 13, and an enlarged diameter portion 33 of shaft 27 is mounted to rotate on ball bearing 34 which is held in the housing 13 by means of snap ring 35.

In turn, the inner race of bearing 34 abuts the upper extension 39 of gear 25 to hold the latter in alignment and to hold the shaft 27 within the housing 13, the boss portion 40 of the shaft also being in rotational and aligning abutment with the inner race of the bearing 34.

In a closure member 41 of housing 13 is an outer annular recess 42 having a watch-type spring 44 therein. The outer end 45 of the spring extends through an axially directed opening in closure 41 and is lapped over its outer surface. The inner end 46 of the spring is similarly secured; that is, it extends through and is lapped over an annular portion 47, which forms a downwardly opening recess 50 which extends from a lower frame member 51 of the chain saw 14. The inner, axially directed surface of the recess 50 is fitted to rotate outwardly of an inner annular boss 52 of the housing 13 and a transverse surface 53 of the recess 50 rotates on an outer surface 56 of the boss 52.

The shaft 27 extends through an opening 57 in the frame member 51 and also extends through opening 58 in outer frame member 59, the two frame members forming an enclosure for a substantial portion of the chain saw. These frame members are secured together by means of bolts 62 which also extend through saw bars 63 and 64, the latter being spaced on the bolts by tubular spacers 65 and 66. Also secured to the chain saw by means of bolts 62 is the girdler depth gauge 69. The latter is in abutment with the lower face of frame member 51 and, as shown in FIG. 3, is adjustable on the bolts by means of slots 70. From the foregoing, it can be clearly seen that the entire chain saw structure is rotatable relative to housing 13.

The outer portion 71 of the shaft 27 has dual saw chain sprocket 74 mounted thereon for rotation, the latter having its inner surface in rotational abutment with boss 40 of the shaft and being held in place by means of nut 75. The sprocket teeth 76 and 77, spaced to effectively form two sprockets, are in respective alignment with the saw bars 63 and 64.

The inner ends 79 and 80 of the saw bars are spaced from the respective sprocket teeth and are curved to be generally complementary to the outline of the sprocket. The edges of the bars outwardly from the inner ends have grooves 81 and 82 therein.

A saw chain, generally designated as 85, is engaged with sprocket teeth 76 and with groove 81 in the bar 63 and, similarly, a saw chain, designated generally as 86, is engaged to be driven by the teeth 77 of the sprocket and to travel in the groove 82 of the bar 64. As best seen in FIG. 2, each of the saw chains, as shown on the chain 85, has side links 87 and center links 88 connected consecutively by pintles 91. The center links have inwardly extending projections 92 which ride in the saw bar grooves and are engaged in and driven by the sprocket. Extending outwardly from selected side links are a pair of alternate, allochiral left and right-hand cutters 93 and 94, respectively. Forwardly of each cutter on its selected side link and spaced therefrom is a depth gauge 97 which is of lesser height than the respective cutting edge.

To provide lubrication for the saw chains and dual sprocket, there extends a lubricating line 98 from the engine 11 to the transmission housing 13 where the latter line is connected to a conduit 99 in the housing, as best seen in FIG. 3. The conduit 99 terminates at the transverse surface of recess 42. Outwardly of the end of conduit 99, between the inner surface of annular portion 47, extending from frame 51, and the outer surface of boss 52, is an annular lubricating passage 100 which serves to lubricate the latter surfaces. Extending into annular passage 100 is tube 103 which extends through frame member 51 and into the two saw bars 63 and 64. In each of the saw bars, joining the tube 103, are transverse passages 104 which connect the latter with the grooves 81 and 82, respectively, in the saw bars. Thus, when oil is supplied from the engine 11, either by automatic or hand operated pump, the contact surfaces between the housing 13 and the frame member 51, the saw chains, and the dual sprocket are lubricated.

Shown to be extending from the frame member 51, at substantially 90° therewith, is a lever-guide 105. The spring 44 is fitted to rotate the chain saw mechanism 14 and the lever-guide 105 in the direction of the arrow 106 in FIG. 2 to a position indicated in the upper view of FIG. 4 in which the lever 105 is in substantial alignment with the shank or handle 12 and the direction of the saw bars is substantially 90° thereto. At this time, spring 44 is in its unwound position.

At the outer end of the saw bars is an additional guard member 108 secured to the bars by means of bolts 109 which, as bolts 62, have spacers 65 and 66 thereon to hold the saw bars in properly spaced alignment. Between the guard 108 and the frame member 59 is a space 110 which serves to permit cutting by the saw chains on the outer portion thereof so that if there are loose branches, suckers or brush in the way of the girdler, they can be removed by the saw chains on either side of the saw bars in a few seconds.

Now referring to FIG. 4, in operation the operator takes the position shown in the upper view, as indicated by the footprints 111 and 112, and places the chain saw 14, as shown, on the rear of the tree relative to him, the lever guide 105 being in its normal position in substantial alignment to the handle 12. At this time, he is ready to start cutting the groove or girdle 114, as shown in FIG. 1. When the running engine is engaged to drive the shaft 20, the sprocket 74 causes the saw chains to move in the direction of the arrow 115 in FIG. 2, and the operator then causes the lever 105 and the chain saw 14 to move in the direction of the arrow 116 in FIG. 4. During this movement, the lever and chain saw are moved against the force of the spring so as to wind it in the recess 42.

As the operator moves the girdler around the tree, it is not necessary for him to move his feet until the position of the lever 105 is past that shown in FIG. 1, which is approximately 270° from that shown in the upper view of FIG. 4. As he moves the girdler around the tree out of the position shown in FIG. 1, he then steps forwardly, as indicated in the lower view of FIG. 4, where he takes the position indicated by footprints 117 and 118. From this position, he may move the guide 105 and the chain saw another 90° around the tree to finish the girdle, at which time the operation is complete. The spring 44 will then rotate the chain saw 14 and the lever 105 on the pivot point provided by the shaft 27 back to its normally unwound position, as shown in the upper view of FIG. 4.

It has been found in the above described operation that a normal 12-inch diameter tree can be girdled in about four seconds and this period is about fifteen times shorter than the fastest other known girdling method.

The depth gauge 69 is provided to limit the depth of the girdle and can be adjusted by loosening the nuts on the bolts 62 and moving the depth gauge to the extent of the slots 70 toward or away from the inner edges of the saw chains.

It is clear that various forms of tree girdlers may be made without departing from the inventive principles of the present invention and which make possible a high speed girdler with which an operator can cut a girdle in a tree without walking around the tree, and in which the width of the girdle can be determined by the width of one or more saw chains or a plurality of high speed cuts.

I claim:

1. A tree girdler comprising: a handle; cutting means pivotally mounted on said handle; and means biasing said cutting means to a position with respect to said handle from which said last means can be started to girdle a tree, said cutting means being pivotable through 360 degrees with respect to said handle against the force of said biasing means.

2. A tree girdler comprising: a handle; a chain saw rotatably mounted adjacent one of its ends on one end of said handle; means to drive said chain saw on the other end of said handle; transmission means extending through said handle from said last means to said chain saw; and means biasing said chain saw to a position with respect to said handle from which said chain saw can be started to cut a groove around a tree, said chain saw being rotatable against the force of said biasing means with respect to said handle as it cuts a groove around said tree.

3. A tree girdler comprising: a chain saw, said chain saw including a frame member; a saw bar secured to said frame member; a saw shaft having one end secured for rotation in a transmission housing to transmission means and having its other end extending into said frame member; a driving sprocket secured to said other end of said shaft for rotation therewith, said sprocket being in alignment with said bar; a saw chain fitted for travel on said bar and for being driven on said sprocket, said frame member being adapted to rotate with respect to said transmission housing and said saw shaft; means connecting said frame member and said transmission housing to bias them against said rotation; a handle having one end secured to said transmission housing; a chain saw driving means on the other end of said handle; and scond transmission means extending through said handle and connecting said driving means to said first transmission means to drive said saw chain.

4. A tree girdler comprising: a chain saw, said chain saw including a frame member; a pair of parallel juxtaposed saw bars secured to said frame member; a saw shaft having one end secured for rotation in a transmission housing to transmission means and having its other end extending into said frame member; a pair of driving sprockets secured to said other end of said shaft for rotation therewith, said sprockets being in alignment with respective bars; a pair of saw chains fitted for respective travel on said bars and for being driven on said respective sprockets, said frame being adapted to rotate with respect to said transmission housing and said saw shaft; means connecting said frame member and said transmission housing to bias them against said rotation; a handle having one end secured to said transmission housing; chain saw driving means on the other end of said handle; and second transmission means extending through said handle and connecting said driving means to said first transmission means to drive said saw chains.

5. A tree girdler comprising: a chain saw, said chain saw including a frame member; a saw bar secured to said frame member; a saw shaft having one end secured for rotation in a transmission housing to transmission means and having its other end extending into said frame member; a driving sprocket secured to said other end of said shaft for rotation therewith, said sprocket being in alignment with said bar; a saw chain fitted for travel on said bar and for being driven on said sprocket, said frame member being adapted to rotate with respect to said transmission housing and said saw shaft; means connecting said frame member and said transmission housing to bias them against said rotation; a handle having one end secured to said transmission housing; a chain saw driving means on the other end of said handle; second transmission means extending through said handle and connecting said driving means to said first transmission means to drive said saw chain; and means to lubricate said sprocket connected to said engine.

6. A tree girdler comprising: a chain saw, said chain saw including a frame member; a saw bar secured to said frame member; a saw shaft having one end secured for rotation in a transmission housing to transmission means and having its other end extending into said frame member; a driving sprocket secured to said other end of said shaft for rotation therewith, said sprocket being in alignment with said bar; a saw chain fitted for travel on said bar and for being driven on said sprocket, said frame member being adapted to rotate with respect to said transmission housing and said saw shaft; means connecting said frame member and said transmission housing to bias them against said rotation; a handle having one end secured to said transmission housing; a saw chain driving means on the other end of said handle; second transmission means extending through said handle and connecting said driving means to said first transmission means to drive said saw chain; and a depth gauge secured to said frame member extending toward a cutting surface of said saw chain along one edge of said bar to limit the depth of the girdle.

7. A tree girdler comprising: a chain saw, said chain saw including a frame member; a saw bar secured to said frame member; a saw shaft having one end secured for rotation in a transmission housing to transmission means and having its other end extending into said frame member; a driving sprocket secured to said other end of said shaft for rotation therewith, said sprocket being in alignment with said bar; a saw chain fitted for travel on said bar and for being driven on said sprocket, said frame member being adapted to rotate with respect to said transmission housing and said saw shaft; means connecting said frame member and said transmission housing to bias them against said rotation; a handle having one end secured to said transmission housing; a saw chain driving means on the other end of said handle; second transmission means extending through said handle and connecting said driving means to said first transmission means to drive said saw chain; a depth gauge secured to said frame member extending toward a cutting surface of said saw chain along one edge of said bar to limit the depth of the girdle; and a lever-guide extending from said frame member to form an angle with the longitudinal axis of said bar, said biasing means connected to return said bar and guide to a predetermined position when no force is tending to rotate said frame member.

8. A tree girdler comprising: a chain saw, said chain saw including a frame member; a pair of parallel juxtaposed saw bars secured to said frame member; a saw shaft having one end secured for rotation in a transmission housing to transmission means and having its other end extending into said frame member; a pair of driving sprockets secured to said other end of said shaft for rotation therewith, said sprockets being in alignment with respective bars; a pair of saw chains fitted for respective travel on said bars and for being driven on said respective sprockets, said frame being adapted to rotate with respect to said transmission housing and said saw shaft; means connecting said frame member and said transmission housing to bias them against said rotation; a handle having one end secured to said transmission housing; chain saw driving means on the other end of said handle; second transmission means extending through said handle and connecting said driving means to said first transmission means to drive said saw chains; and a lever-guide extending from said frame member to form an angle with the longitudinal axes of said bars, said biasing means connected to return said bars and guide to a predetermined position when no force is tending to rotate said frame member.

9. A tree girder comprising: a chain saw, said chain saw including a frame member; a saw bar secured to said frame member; a saw shaft having one end secured for rotation in a transmission housing to transmission means and having its other end extending into said frame member; a driving sprocket secured to said other end of said shaft for rotation therewith, said sprocket being in alignment with said bar; a saw chain fitted for travel on said bar and for being driven on said sprocket, said frame member being adapted to rotate with respect to said transmission housing and said saw shaft; means connecting said frame member and said transmission housing to bias them against said rotation; a handle having one end secured to said transmission housing; a saw chain driving means on the other end of said handle; second transmission means extending through said handle and connecting said driving means to said first transmission means to drive said saw chain; a depth gauge secured to said frame member extending toward a cutting surface of said saw chain along one edge of said bar to limit the depth of the girdle; and a lever-guide extending from said frame member to form a substantial right angle with the longitudinal axis of said bar, said biasing means connected to return said bar and guide to a predetermined position when no force is tending to rotate said frame member.

10. A tree girdler comprising: a chain saw, said chain saw including a frame member; a pair of parallel juxtaposed saw bars secured to said frame member; a saw shaft having one end secured for rotation in a transmission housing to transmission means and having its other end extending into said frame member; a pair of driving sprockets secured to said other end of said shaft for rotation therewith, said sprockets being in alignment with respective bars; a pair of saw chains fitted for respective travel on said bars and for being driven on said respective sprockets, said frame being adapted to rotate with respect to said transmission housing and said saw shaft; means connecting said frame member and said transmission housing to bias them against said rotation; a handle having one end secured to said transmission housing; chain saw driving means on the other end of said handle; second transmission means extending through said handle and connecting said driving means to said first transmission means to drive said saw chains; and a lever-guide extending from said frame member to form a substantial right angle with the longitudinal axes of said bars, said biasing means connected to return said bars and guide to a predetermined position when no force is tending to rotate said frame member.

11. A tree girdler comprising: a chain saw, said chain saw including a frame member; a pair of parallel juxtaposed saw bars secured to said frame member; a saw shaft having one end secured for rotation in a transmission housing to transmission means and having its other end extending into said frame member; a pair of driving sprockets secured to said other end of said shaft for rotation therewith, said sprockets being in alignment with respective bars; a pair of saw chains fitted for respective travel on said bars and for being driven on said respective sprockets, said frame being adapted to rotate with respect to said transmission housing and said saw shaft;

means connecting said frame member and said transmission housing to bias them against said rotation; a handle having one end secured to said transmission housing; chain saw driving means on the other end of said handle; second transmission means extending through said handle and connecting said driving means to said first transmission means to drive said saw chains; a lever-guide extending from said frame member to form a substantial right angle with the longitudinal axes of said bars, said biasing means connected to return said bars and guide to a predetermined position when no force is tending to rotate said frame member; and means to supply lubrication to said sprockets, said last means being connected to said chain saw driving means at one end thereof and extending to a position adjacent to said sprockets.

12. A tree girdler comprising: a chain saw, said chain saw including a frame member; a pair of parallel juxtaposed saw bars secured to said frame member; a saw shaft having one end secured for rotation in a transmission housing to transmission means and having its other end extending into said frame member; a pair of driving sprockets secured to said other end of said shaft for rotation therewith, said sprockets being in alignment with respective bars; a pair of saw chains fitted for respective travel on said bars and for being driven on said respective sprockets, said frame being adapted to rotate with respect to said transmission housing and said saw shaft; means connecting said frame member and said transmission housing to bias them against said rotation; a handle having one end secured to said transmission housing; chain saw driving means on the other end of said handle; second transmission means extending through said handle and connecting said driving means to said first transmission means to drive said saw chains; a lever-guide extending from said frame member to form a substantial right angle with the longitudinal axes of said bars, said biasing means connected to return said bars and said guide to a predetermined position when no force is tending to rotate said frame member; and a depth gauge secured to said frame member extending toward a longitudinal edge of said bars adjacent said lever guide to limit the depth of the girdle.

13. A tree girdler comprising: a chain saw, said chain saw including a frame member; a pair of parallel juxtaposed saw bars secured to said frame member; a saw shaft having one end secured for rotation in a transmission housing to transmission means and having its other end extending into said frame member; a pair of driving sprockets secured to said other end of said shaft for rotation therewith, said sprockets being in alignment with respective bars; a pair of saw chains fitted for respective travel on said bars and for being driven on said respective sprockets, said frame being adapted to rotate with respect to said transmission housing and said saw shaft; means connecting said frame member and said transmission housing to bias them against said rotation; a handle having one end secured to said transmission housing; chain saw driving means on the other end of said handle; second transmission means extending through said handle and conecting said driving means to said first transmission means to drive said saw chains; a lever-guide extending from said frame member to form a substantial right angle with the longitudinal axes of said bars, said biasing means connected to return said bars and said guide to a predetermined position when no applied force is tending to rotate said frame member; a depth gauge secured to said frame member extending toward a longitudinal edge of said bars adjacent said lever-guide to limit the depth of the girdle; and guard means extending over a portion of said saw chains and corresponding edges of said bars opposite said edges adjacent said lever guide.

References Cited in the file of this patent

UNITED STATES PATENTS

| | | |
|---|---|---|
| 278,686 | Daigneau | June 5, 1883 |
| 1,937,073 | Stuve | Nov. 28, 1933 |
| 1,952,270 | March | Mar. 27, 1934 |
| 2,637,357 | Johnson | May 5, 1953 |
| 2,703,928 | Southwick | Mar. 15, 1955 |
| 2,707,007 | Shuff | Apr. 26, 1955 |
| 2,760,307 | Tiblom | Aug. 28, 1956 |
| 2,792,670 | Haynes | May 21, 1957 |
| 2,832,136 | Trecker | Apr. 29, 1958 |